Aug. 23, 1966  N. W. MacFEE  3,268,646
METHOD OF MANUFACTURING SLIDE FASTENER STRINGERS
Original Filed July 30, 1962  3 Sheets-Sheet 1
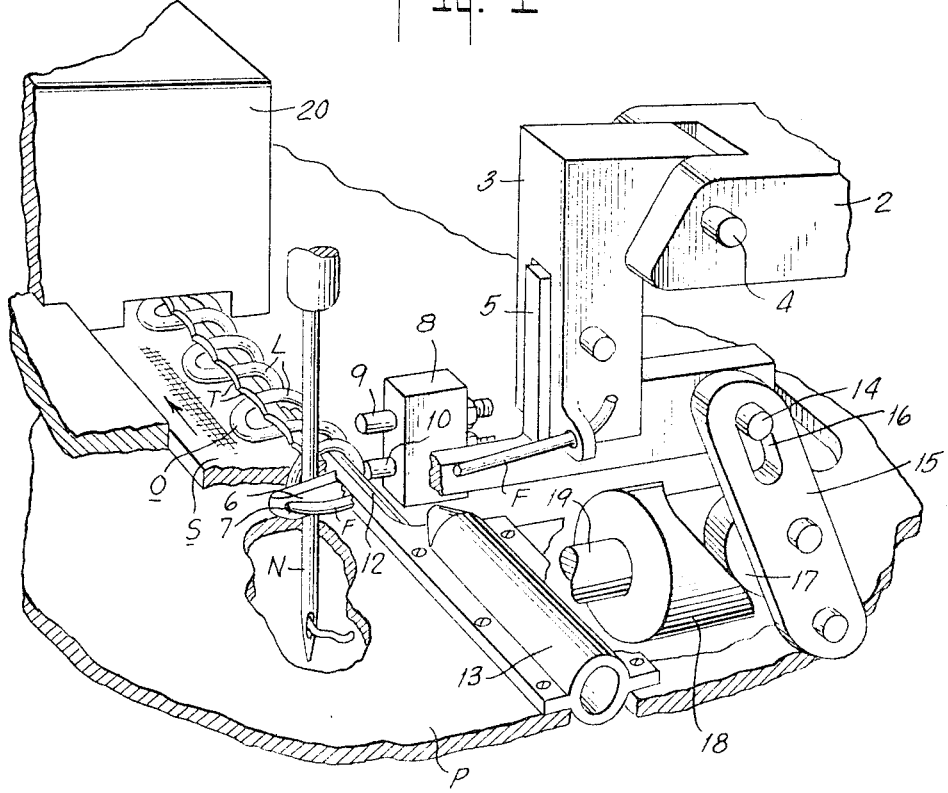
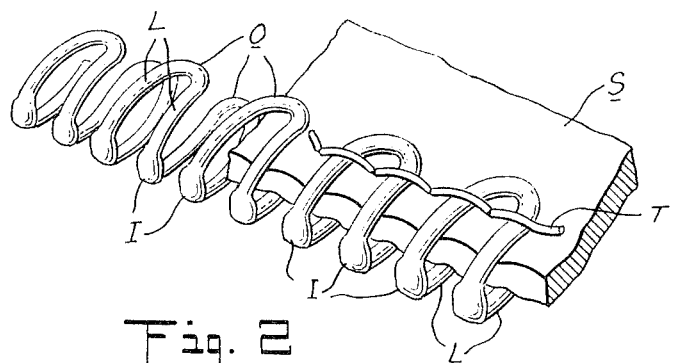
INVENTOR.
NORMAN W. MacFEE
BY R. E. Meech
ATTORNEY Aug. 23, 1966   N. W. MacFEE   3,268,646
METHOD OF MANUFACTURING SLIDE FASTENER STRINGERS
Original Filed July 30, 1962   3 Sheets-Sheet 2
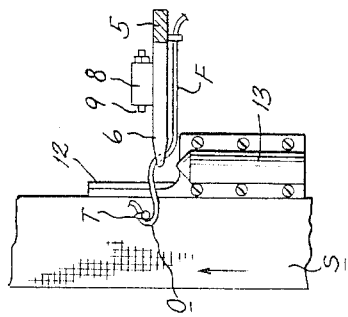
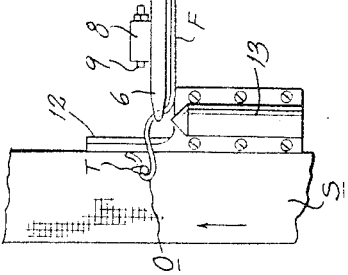
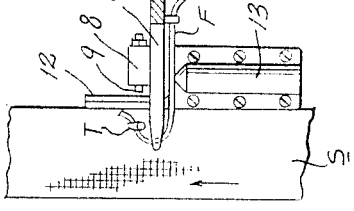
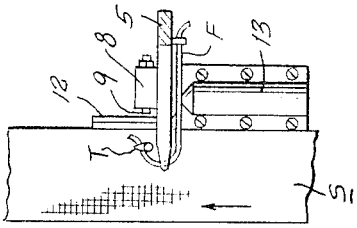
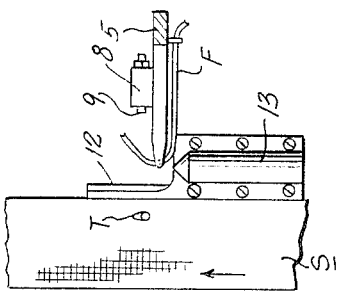
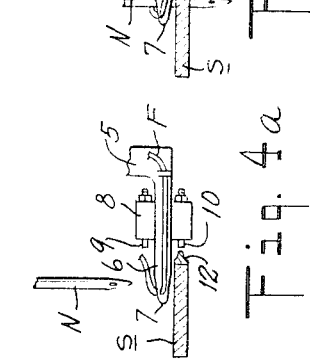
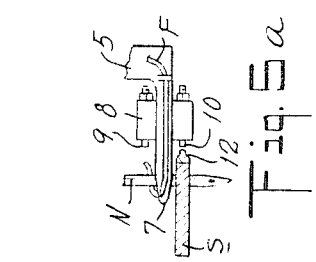
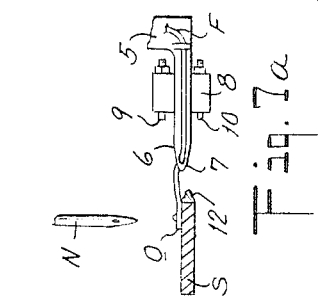
INVENTOR.
NORMAN W. MacFEE
BY R. E. Meech
ATTORNEY Aug. 23, 1966  N. W. MacFEE  3,268,646
METHOD OF MANUFACTURING SLIDE FASTENER STRINGERS
Original Filed July 30, 1962  3 Sheets-Sheet 3
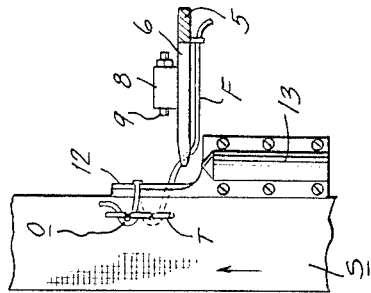
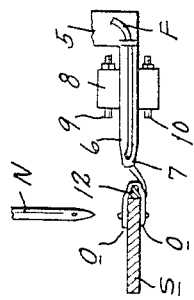
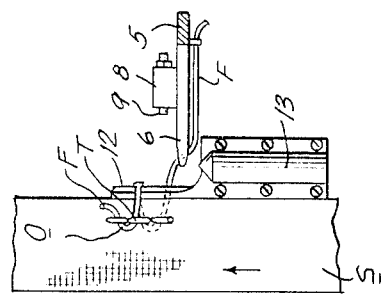
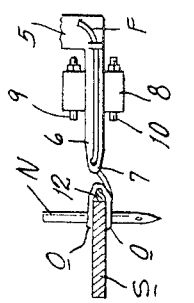
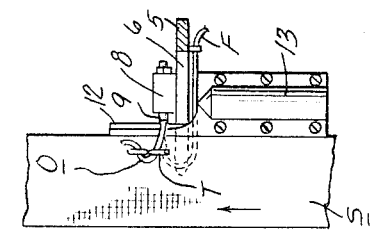
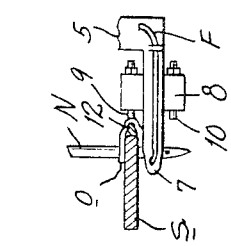
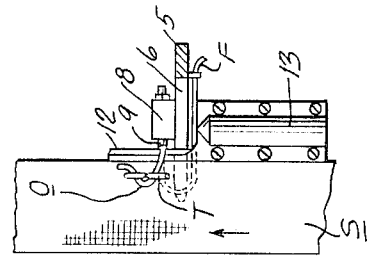
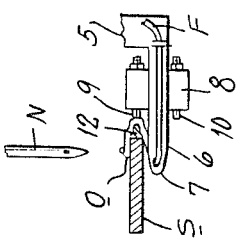
INVENTOR.
NORMAN W. MACFEE
BY
R. E. Meech
ATTORNEY United States Patent Office 3,268,646
Patented August 23, 1966

3,268,646
METHOD OF MANUFACTURING SLIDE
FASTENER STRINGERS
Norman W. MacFee, Conneaut Lake, Pa., assignor to
Talon, Inc., a corporation of Pennsylvania
Original application July 30, 1962, Ser. No. 213,208, now
Patent No. 3,176,637, dated Apr. 6, 1965. Divided
and this application Oct. 5, 1964, Ser. No. 401,515
1 Claim. (Cl. 264—285)

This application is a division of my co-pending application Serial No. 213,208, filed July 30, 1962, now Patent No. 3,176,637.

This invention relates to the manufacture of stringers for slide fasteners of the type having interlocking fastener elements formed from a continuous filamentary material, such as nylon or some other suitable synthetic plastic filament, which is attached to the edge of a tape, and more particularly, to a new improved method which can be practiced with a conventional sewing machine for forming and sewing simultaneously the deformed filament to the edge of the tape.

Heretofore, slide fasteners of this type were usually manufactured on complicated special machines which were expensive to build and maintain. Usually the filament was deformed in one machine in a connected series of fastener elements or helices, then sewn to the edge of a tape by means of a special type sewing machine. Such a method of making this type of fastener was not only expensive but laborious.

According to the present invention, a tape is fed into and through a conventional type sewing machine and the plastic filament is fed into the machine adjacent the edge of the tape formed and sewn thereto in the normal operation of the sewing machine so as to produce a completed slide fastener stringer thereby eliminating the need for two or more machines which reduces the cost of manufacture of such a stringer to a minimum.

Accordingly, it is the general object of the present invention to provide an improved method of forming and attaching a continuous plastic filament to the edge of a tape in a conventional sewing machine which is efficient and effective and, at the same time, produces a satisfactory slide fastener stringer.

It is another object of the invention to provide a simple and inexpensive method for producing such a stringer which can be conveniently practiced with a conventional sewing machine.

Various other objects and advantages of this invention will be more apparent in the course of the following specification, and will be particularly pointed out in the appended claim.

In the accompanying drawings, there is shown for the purpose of illustration, an embodiment which my invention may assume in practice.

In these drawings:

FIG. 1 is a diagrammatic perspective view of the arrangement of the mechanism employed for practicing the method in accordance with the present invention, FIG. 2 is a fragmentary perspective view of a slide fastener stringer made in accordance with the method of the present invention, FIGS. 3 and 3a are diagrammatic plan and end views, respectively, of an arrangement of the mechanism as shown in FIG. 1 showing the first step in the operation thereof, and FIGS. 4 and 4a through 11 and 11a, are views similar to FIGS. 3 and 3a showing the successive steps in the operation of the mechanism in practicing the method of the present invention.

Referring more particularly to the drawings, the mechanism for practicing the method in accordance with the present invention may be incorporated with any existing and conventional single needle sewing machine preferably of the double-locked stitch type wherein there is provided a throat plate P and a reciprocating needle N and a looper (not shown) which is actuated in a manner well known to those skilled in the art.

In order to practice the method of the present invention, there is incorporated with such a sewing machine a reciprocable drive lever 2 having a bifurcated arm 3 pivotally attached thereto as at 4. There is carried by the bifurcated portion of this arm 3, a filament looper member 5 having a needle-like extension 6 with an eye 7 arranged in the outer end thereof.

There is carried by this extension 6 to one side thereof, a heading hammer 8 having a pair of spaced-apart heading members 9 and 10 arranged therewith. Along the edge of the sewing plate P there is arranged a heating anvil or mandrel 12 having a cylindrical heat cartridge holder 13 arranged therewith in which a conventional heat cartridge (not shown) is adapted to be positioned for heating the heating mandrel 12.

In the outer end of the filament looper member 5, there is arranged a pin 14 which is positioned in a slotted opening 16 in one end of a lever 15. On the lower end of this lever 15 there is arranged a cam follower 17 which cooperates with a barrel cam member 18 arranged on the main drive shaft 19 of the sewing machine.

At the delivery end of the sewing machine there is provided preferably a heating chamber 20 which may be heated in any suitable manner. Beyond this heating chamber 20 there is arranged preferably a plurality of forming rolls (not shown) for finally forming and setting the filament on the edge of the tape.

Having described the arrangement of the parts of the improved mechanism for practicing the method of the present invention it operates in the following manner. It will be assumed that the needle N is threaded preferably with a nylon thread T and that the eye 7 of the needle-like extension 6 of the filament looper member 5 has been threaded with a plastic filament F and that the tape S has been positioned upon the throat plate P in under the needle N in readiness for operation. The sewing machine is then set in operation.

In the first step of operation as shown in FIGS. 3 through 5 of the drawing the filament looper member 5 together with the filament F carried thereby moves to a protracted position over one side or top of the tape S so as to position a loop O of the filament on that side of the tape. At about this time the needle N descends and passes through the loop thus formed. The filament looper member 5 then moves to its retracted position as shown in FIGS. 6 and 6a of the drawings so as to leave the loop positioned around the needle N. The needle N is then moved to its retracted position, as shown in FIGS. 7 and 7a, and the tape S moves forwardly into and through the machine and a stitch is formed around a leg portion L of the loop O.

It will be understood that the drive lever 2 to which the filament looper member 5 is attached is driven at one-half the speed of the main drive shaft 19. Such an arrangement permits this filament looper member 5 to move above and below the edge of the tape S on alternate strokes of the needle N. Consequently, on the next protracted movement of the filament looper member 5 a loop O of the filament F will be formed and positioned on the under side of the tape S as shown in FIGS. 8 and 8a of the drawings. As the filament is moved to position the loop in the underside of the tape S it will be seen that a loop of the filament is formed around the anvil or mandrel 12 extending outwardly from the edge of the tape. The needle N then passes through the loop formed on the under side of the tape as shown in FIGS. 9 and 9a. The filament looper member 5 is then again moved to its retracted position leaving a loop of the filament around the needle N, as shown in FIGS. 10 and 10a. The needle N then ascends to its retracted position so as to stitch the leg portions of that loop to the tape, as shown in FIGS. 11 and 11a of the drawings. This completes one cycle of operation of the mechanism and the operation is repeated to form successive loops and head portions in the filament around the mandrel 12 and the edge of the tape S.

It will be understood that the timing of the mechanism just described is such that the filament looper member 5 will be moved to its protracted position before the needle N descends and held there until the needle has bottomed, at which time, the filament looper member will be moved quickly to its retracted position leaving a loop O of the filament around the needle.

As hereinbefore explained, a loop of the filament F is formed around the mandrel 12 on two protracted movements of the filament looper member 5 so as to provide a series of spaced-apart head portions H extending outwardly from the edge of the tape S, as more clearly shown in FIGS. 1 and 2 of the drawings. It will be understood on each protracted movement of the filament looper member 5, the heading members 9 and 10 carried thereby will alternately strike the outer side of successive head portions H and in cooperation with the heated mandrel 12 deform the central portion of the same so as to provide interlocking heads I on each of head portions H. The pitch of the fastener head portions H will be determined by the tape driving mechanism (not shown) which will be timed relative to the main drive shaft of the sewing machine.

After the fastener stringer has been formed as just described, it passes through the heating chamber 20 with the formed fastener elements then passing preferably between the forming rolls (not shown) to shape the fastener elements to the proper dimensions.

As a result of my invention, it will be seen that there is provided a simple and inexpensive mechanism which may be conveniently incorporated with a sewing machine for making slide fastener stringers of the plastic filament type. It will also be seen that there is provided a method of making such a stringer whereby the filament is fed into the sewing machine, formed therein and simultaneously attached to the edge of a tape so as to reduce to a minimum the number of operations to produce such a stringer which is a decided advantage in the manufacture thereof.

While I have shown and described an embodiment which my invention may assume in practice, it will be understood that this embodiment is merely for the purpose of illustration and description, and that other forms may be devised within the scope of my invention as defined in the appended claim.

What I claim as my invention is:

In a method of manufacturing slide fastener stringers on a sewing machine having a reciprocating needle arranged therewith, which stringers consist of a continuous filament formed into fastener elements sewn to the edges of a tape, the steps which include:

continuously advancing a flat stringer tape into and through the machine, with the tape lying in a plane located substantially transverse to the axis along which the needle moves in a reciprocal manner, feeding a substantially straight continuous length of filament into the machine to a point adjacent one edge of said tape and in a direction substantially parallel to the plane of the tape and substantially transverse to both the axis of reciprocal movement of the needle and the edge of the moving tape;

laying the filament in a direction substantially transverse to the direction of the continuously advancing tape which results in the filament overlying the tape at an oblique angle relative to the edge of the tape, passing the needle, carrying a sewing thread, transversely through the tape at a point adjacent to the edge of the filament and intermediate the filament and the edge of the tape to stitch the overlying portion of the filament to the tape, reversing the direction of the laying of the filament over the tape while the needle remains passed through the tape so that the filament is wrapped about the needle to form the second leg of a loop which second leg extends toward the given edge of the tape, moving the filament over the edge of the tape and around a stationary mandrel arranged along the edge of the tape prior to performing another cycle with the filament on the opposite side of said tape, withdrawing and passing the needle carrying the sewing thread through the tape to simultaneously stitch the second leg of the loop to the tape and also to provide the means for forming the next succeeding loop with each succeeding loops alternately placed on opposite sides of said tape, and deforming each of the spaced-apart portions of the filament extending outwardly from the edge of the tape substantially simultaneously with the placing of the filament around the edge of said mandrel so as to form an interlocking head portion thereon.

References Cited by the Examiner

UNITED STATES PATENTS 3,038,207  6/1962  Schwartz _____ 264—285
3,054,171  9/1962  Ruhrmann et al. _____ 264—285

ROBERT F. WHITE, Primary Examiner.

F. MARLOWE, L. S. SQUIRES, Assistant Examiners.